Dec. 11, 1951     T. F. GARRAHAN, JR     2,578,533
TORQUE LIMITER
Filed March 31, 1950
Fig. 1.
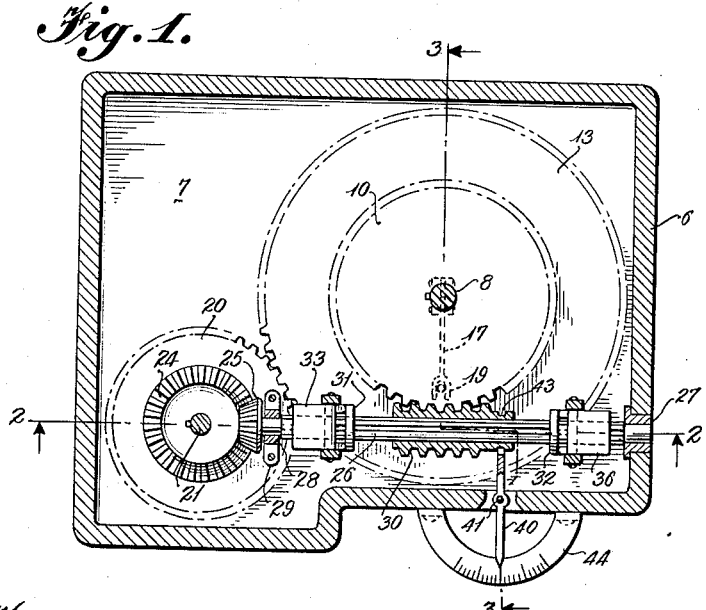
Fig. 2.
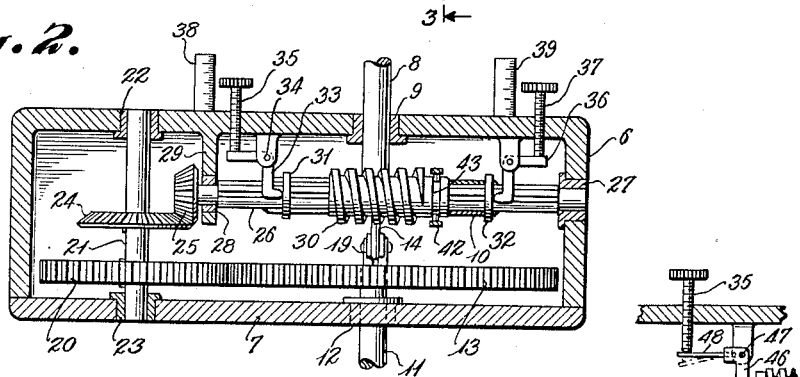
Fig. 3.
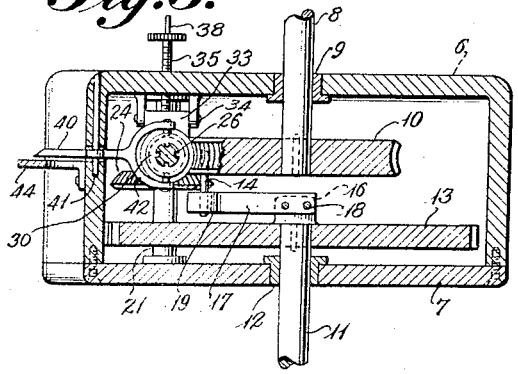
Fig. 5.
Fig. 4.
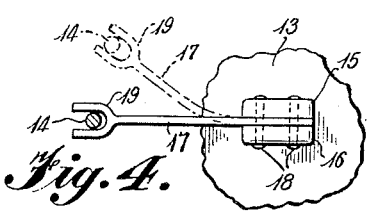
INVENTOR
Thomas F. Garrahan, Jr.
BY Burns, Doane + Benedict
ATTORNEYS Patented Dec. 11, 1951

2,578,533

UNITED STATES PATENT OFFICE 2,578,533

TORQUE LIMITER

Thomas F. Garrahan, Jr., Washington, D. C.

Application March 31, 1950, Serial No. 153,090

6 Claims. (Cl. 74—411)

The present invention relates to apparatus for limiting the torque transmitted to a driven member from a driving member.

There are many instances in which an excess of torque exists in a driving member, such as a shaft, over and above the torque which it is necessary or desirable to transmit to a driven member or shaft. One example exists in the case of a spring motor which is capable of exerting high torque when fully wound. The torque which the fully wound motor is capable of exerting often far exceeds the torque which is desired in a shaft or member to be driven by the motor. A similar situation may exist with a motor of the gravity type in which the power is derived from the effect of gravity on a mass. Torque limiting wrenches afford a further example of an instance in which it is necessary or desirable to limit the torque in a driven member. Many machines are designed to accommodate a maximum load but are provided with sources of power capable of exceeding such maximum load. Apparatus according to my invention can be installed between the source of power and the machine to limit the torque supplied to the machine to that which is within the safe limit for which the machine was designed. The above examples of fields of utility are exemplary only and it will be apparent that apparatus embodying my invention will be useful in any instance in which it is desirable to reduce or limit the torque transmitted from a driving member to a driven member.

In practicing my invention I utilize a stressed resilient element as the sole effective driving connection from the driving member to the driven member. The resilient element is stressed sufficiently to impart the desired torque to the driven member. A gear train which is self-locking in one direction is also interposed between the driving and driven members. This gear train is self-locking in a direction which prevents the driving member from transmitting torque through the gear train to the driven member. This arrangement permits the resilient element to constitute the sole effective driving means for the driven member. Movement of the driven member acts through the gear train to permit the driving member to move in a direction to maintain the stress in the resilient element.

One of the primary objects of my invention is to provide a simple, efficient and inexpensive apparatus for positively limiting the torque transmitted from a driving member to a driven member. A further object of the invention is to utilize a resilient element as the sole effective driving connection between a driving member and a driven member and to utilize a gear train which is self-locking in one direction and arranged to maintain the stress in the resilient element at the desired value. Still another object of the invention is to provide a torque limiter of the type described which includes an indicator for directly indicating the torque being transmitted to the driven member. Another object of the invention is to provide a torque limiter which enables the torque transmitted to the driven member to be proportional to the torque existing in the driving member.

The foregoing and other objects of the invention and the manner in which those objects are achieved may be fully understood from the following detailed description which has reference to the accompanying drawing wherein:

Fig. 1 is a transverse sectional view through an exempary form of apparatus embodying my invention;

Fig. 2 is a sectional view taken in the direction of the arrows along the line 2—2 of Fig. 1;

Fig. 3 is a sectional view taken in the direction of the arrows along the line 3—3 of Fig. 1;

Fig. 4 is a fragmentary view showing the resilient element which constitutes the sole effective driving connection between the driving and driven members; and Fig. 5 is a fragmentary view illustrating a modified form of the invention which enables the apparatus to transmit a torque to the driven member which is proportional to that existing in the driving member.

The apparatus may include a housing 6 provided with a removable cover plate 7. An input or driving shaft 8 is rotatably mounted in a bearing 9 in the casing 6. A worm wheel 10 is keyed or otherwise secured to the inner end of the driving shaft 8. An output member or driven shaft 11 is rotatably mounted in a bearing 12 in the cover plate 7. A large spur gear 13 is keyed or otherwise secured to the inner end of the driven shaft 11. A pin 14 is rigidly secured to the inner face of the worm wheel 10 and projects toward the adjacent face of the spur gear 13. The spur gear 13 has approximately centrally positioned on the inner face thereof a pair of bosses 15 and 16. The inner end of a resilient element 17, illustrated as a leaf spring, is positioned between the bosses 15 and 16 and secured thereto by means of suitable fasteners such as rivets 18. The outer end of the resilient element 15 is bifurcated as indicated at 19 and the bifurcated end straddles the pin 14 on the worm wheel 10.

The resilient element 17 constitutes the sole effective driving connection between the worm wheel 10 (attached to the driving shaft 8) and the spur gear 13 (attached to the driven shaft 11). In other words, the only torque which can be transmitted from the driving shaft 8 to the driven shaft 11 must be transmitted through the resilient element 17. Torque can be transmitted to the driven shaft 11 only while the resilient element 17 is stressed, and I provide means for maintaining stress in the spring during operation of the device. The spur gear 13 meshes with a spur gear 20 keyed or otherwise secured to a shaft 21. The shaft 21 is journaled in a bearing 22 in the casing and a bearing 23 in the cover plate 7. Also secured to the shaft 21 is a bevel gear 24 which meshes with a bevel pinion 25. The bevel pinion 25 is fixed to a splined or fluted shaft 26 which is journaled in a bearing 27 in the casing 6. The inner end of the shaft 26 is rotatably mounted in a bearing 28 carried by an inwardly projecting boss 29 within the casing 6.

A worm 30 is positioned on the shaft 26. The worm 30 may be free to move longitudinally of the shaft 26 but is prevented from rotation on that shaft by teeth in the central bore thereof which cooperate with the flutes or splines of the shaft in a manner which will be clearly understood. The worm 30 meshes with the worm wheel 10.

The pitch of the worm 30 is such that the worm and worm wheel assembly is self-locking in one direction. In other words, power or torque can be transmitted from the shaft 26 through the worm 30 to the worm wheel 10 and the driving shaft 8. However, power cannot be transmitted from the driving shaft 8 and the worm wheel 10 through the worm 30 to the shaft 26.

The extent of longitudinal movement of the worm 30 along the shaft 26 is controlled by stop rings 31 and 32. A bell crank lever 33 is pivoted at 34 and has one arm in engagement with the outer face of the stop ring 31. An adjusting screw 35 is threaded through an aperture in the casing 6 and the inner end of this screw engages an arm of the bell crank lever 33. It will thus be seen that rotation of the screw 35 will operate to adjust the position of the stop ring 31 longitudinally of the shaft 26. The stop ring 32 is similarly engaged by one arm of a bell crank lever 36 and the position of this stop ring is controlled by a threaded screw 37.

It is possible to adjust the stop rings 31 and 32 to such positions that the worm 30 is fixed against longitudinal movement along the shaft 26 and, for the purposes of initial explanation of operation of the device, this condition will be assumed. The position longitudinally of the shaft 26 which is occupied by the worm 30 while that worm is immovable along the shaft will determine the extent of deformation of the resilient element 17 and the resultant stress in that element. If it is assumed that the driving shaft 8 is to be rotated in a clockwise direction, the worm 30 is positioned along the shaft 26 to stress the resilient element 17 in a manner to cause or tend to cause the driven shaft 11 to rotate in a clockwise direction. Under these conditions the only force imparting torque to the driven shaft 11 is the stress in the resilient element 17 and, since that stress can be controlled by adjustment of the worm 30 longitudinally of the shaft 26, the amount of torque transmitted to the driven shaft 11 can also be controlled. The self-locking character of the worm wheel 10 and the worm 30 prevents torque from being transmitted from the shaft 8 through the worm wheel 10, the worm 30, the shaft 26, the bevel pinion 25, the bevel gear 24, the shaft 21, the spur gear 20 and the spur gear 13 to the driven shaft 11. However, the stressed resilient element 17 imparts torque to the driven shaft 11 and rotation of that shaft causes the spur gears 13 and 20, the shaft 21, the bevel gear 24, the bevel pinion 25, the shaft 26 and the worm 30 to rotate. This rotation of the worm 30 permits the worm wheel 10 and the driving shaft 8 to rotate, thus restoring or maintaining the stress in the resilient element 17. The gears constituting the gear train require that the driving and driven shafts rotate at the same rate. It will be found that the apparatus will operate smoothly and continuously to impart to the driven shaft 11 only that torque which is determined by the stress in the resilient element 17, which stress can be predetermined or selected by longitudinal adjustment of the worm 30 along the shaft 26. For any given adjustment of the worm 30 along the shaft 26 the torque transmitted to the driven shaft 11 will remain constant at or less than the value established by the predetermined or selected stress in the resilient element 17.

It has been assumed during the foregoing explanation that the driving and driven shafts are to rotate in a clockwise direction and that the worm 30 is fixed against longitudinal movement along the shaft 26. The driving and driven shafts can, however, rotate in either direction and, as illustrated in the drawing, the stop rings 31 and 32 are preferably adjusted to positions which enable the desired torque to be transmitted to the driven shaft 11 in either direction of rotation of the driving and driven shafts. The drawing illustrates the position of the worm 30 when the resilient element 17 assumes its normal unstressed position. This condition exists only while no torque exists in the driving shaft 8. If torque is applied to the driving shaft 8 tending to rotate that shaft in a clockwise direction, the worm 30 may move longitudinally of the shaft 26 until the worm engages the stop ring 31. The resilient element 30 will be stressed during this longitudinal movement of the worm and the maximum stress in the resilient element will be controlled by the position of the stop ring 31. Similarly, if torque is applied to the driving shaft 8 to rotate that shaft in a counterclockwise direction, the worm 30 will move longitudinally of the shaft 26 and it may engage the stop ring 32. In this latter case the resilient element 17 will be deformed in the opposite direction and the maximum stress within the resilient element will be governed by the position of the stop ring 32.

I prefer to provide scales 38 and 39 for indicating the positions of the heads of the screws 35 and 37 and thus indirectly indicating the positions of the stop rings 31 and 32. The scales 38 and 39 may be calibrated to indicate directly the torque which can be transmitted to the driven shaft 11. It will be apparent that the adjusting screws 35 and 37 may be set at different values so that the apparatus will transmit a given torque in one direction of rotation of the driving and driven shafts and a different torque when those shafts rotate in the opposite direction.

The stop rings 31 and 32 function only to limit the maximum torque which can be transmitted to the driven shaft 11. When the torque actually transmitted to the driven shaft to rotate the same is less than the selected maximum, the worm 30 will not engage either stop rings 31 or 32 but will assume some position intermediate the neutral position illustrated in the drawing and actual engagement with one of the stop rings. For this reason and for the additional reason that it is frequently desirable to have a direct reading of the torque being transmitted to or absorbed by a driven member, I provide indicator means for continuously indicating the position of the worm 30 and consequently the value of the torque being transmitted to the driven shaft 11. This indicator means may take the form of a pointer 40 pivoted to the casing at 41 and being bifurcated to form a yoke 42 at its inner end. The yoke 42 cooperates with a circumferential groove 43 in one end of the worm 30 and the position of the outer end of the pointer 40 is thus controlled by the position of the worm 30. The outer end of the pointer 40 cooperates with a scale 44 which is calibrated to give a direct reading of the torque being transmitted to the driven shaft 11.

Fig. 5 illustrates a modification of a portion of the device which enables the torque transmitted to the driven shaft to be proportional to the torque applied to the driving shaft. The shaft 26, worm 30, stop ring 31 and adjusting screw 35 may be identical with the corresponding elements described above. However, the bell crank lever 46 which is pivoted at 47 has one rigid leg which engages the stop ring 31 and a resilient leg 48 which is engaged by the adjusting screw 35. The resilient leg 48 may be in the form of a leaf spring securely anchored at one end in the bell crank lever 46. In this embodiment of the invention the top ring 31 does not have its position definitely fixed by the adjusting screw 35, but is free to move against the action of the leaf spring 48. The strength and spring rate of the spring 48 can be correlated to the strength and spring rate of the resilient element 17 to enable the torque transmitted to the driven shaft 11 to bear a definite proportional relationship to the torque applied to the driving shaft 8. The stop ring 32 may be provided with a similar resilient adjusting mechanism to give the same result when the rotation of the shaft is in the opposite direction.

It will be seen from the foregoing description that I have provided simple, inexpensive and practical apparatus for limiting the torque transmitted to driven member in either direction of rotation of the driving and driven members. It will also be seen that I have provided apparatus which gives a direct reading of torque applied to a driven member. I have also provided apparatus which enables the torque transmitted to the driven member to be proportional to the torque applied to the driving member.

The forms of the invention which I have illustrated and described are exemplary only. It will be obvious that various modifications or substitutions of equivalents may be resorted to without departing from the broad scope of the invention as defined by the following claims.

Having thus described my invention, I claim:

1. Apparatus for limiting the torque transmitted from a source of power to a driven member comprising a resilient element connecting said power source to said driven member, said resilient element being stressed to exert the desired limited torque on said driven member and constituting the sole effective driving connection from said power source to said driven member, a gear directly connected to said power source, and gearing connecting said driven member to said gear, said gearing being of the type that is self-locking in one direction to prevent transmission of torque therethrough from said power source to said driven member and whereby said power source is permitted to maintain stress in said resilient element during movement of said driven member.

2. Apparatus for limiting the torque transmitted from a driving shaft to a driven shaft comprising a worm wheel secured to said driving shaft, a worm in engagement with said worm wheel, gearing connecting said worm to said driven shaft, said worm and worm wheel being self-locking in one direction to prevent transmission of torque through said gearing from said driving shaft to said driven shaft but permitting said driving shaft to rotate upon rotation of said driven shaft, and a resilient element connecting said shafts, said resilient element being stressed to impart the desired torque to said driven shaft.

3. Apparatus for transmitting torque from a driving shaft to a driven shaft comprising a worm wheel secured to said driving shaft, a worm in engagement with said worm wheel, a countershaft on which said worm is splined, gearing connecting said countershaft to said driven shaft, said worm and worm wheel being self-locking in one direction to prevent transmission of torque through said gearing from said driving shaft to said driven shaft but permitting said driving shaft to rotate upon rotation of said driven shaft, a resilient element connecting said shafts, said resilient element being stressed to impart the desired torque to said driven shaft, and an adjustable stop on said countershaft to limit the longitudinal movement of said worm along said countershaft to thereby adjust the stress in said resilient element.

4. Apparatus as defined in claim 3 in which said worm is movable longitudinally of said countershaft against the resistance of a spring member to thereby automatically adjust the stress in said resilient element to cause the torque transmitted to said driven shaft to be proportional to the torque in said driving shaft.

5. Apparatus as defined in claim 3 in which a pointer is connected to said worm for indicating the position of the worm longitudinally of the shaft and thereby serving as an indication of the torque being transmitted to the driven shaft.

6. Apparatus for limiting the torque transmitted from a driving member to a driven member comprising a train of gears between said driving and driven members, said gear train including a worm and worm wheel being of the type which is self-locking in a direction to prevent transmission of torque from said driving member to said driven member through said gear train but permitting movement of said driving member to follow movement of said driven member, and a resilient element connecting said driving member to said driven member, said resilient element being stressed and constituting the sole effective driving connection between said driving and driven members, the maximum stress in said resilient element being limited by said gear train whereby said resilient element imparts limited torque to said driven member.

THOMAS F. GARRAHAN, JR.

REFERENCES CITED

The following references are of record in the file of this patent:

UNITED STATES PATENTS

| Number | Name | Date |
| --- | --- | --- |
| 1,227,107 | Blomfield | May 22, 1917 |
| 1,972,377 | Laderriere | Sept. 4, 1934 |
| 2,031,608 | Kiel | Feb. 25, 1936 |
| 2,092,883 | Kellogg | Sept. 14, 1937 |
| 2,399,925 | Hewlett, Jr. | May 7, 1946 |
| 2,470,390 | Consier | May 17, 1949 |
| 2,527,658 | Sinclair | Oct. 31, 1950 |